US012602344B2

(12) United States Patent
Qin

(10) Patent No.: US 12,602,344 B2
(45) Date of Patent: Apr. 14, 2026

(54) NETWORK STORAGE METHOD, STORAGE SYSTEM, DATA PROCESSING UNIT, AND COMPUTER SYSTEM

(71) Applicant: Huawei Technologies Co., Ltd., Shenzhen (CN)

(72) Inventor: Guo Qin, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/647,189

(22) Filed: Apr. 26, 2024

(65) Prior Publication Data

US 2024/0273050 A1 Aug. 15, 2024

Related U.S. Application Data

(63) Continuation of application No. PCT/CN2022/127306, filed on Oct. 25, 2022.

(30) Foreign Application Priority Data

Oct. 27, 2021 (CN) .......................... 202111258240.8

(51) Int. Cl.
*G06F 13/42* (2006.01)

(52) U.S. Cl.
CPC .. *G06F 13/4221* (2013.01); *G06F 2213/0026* (2013.01)

(58) Field of Classification Search
CPC .................... G06F 13/4221; G06F 2213/0026
USPC ........................................................ 710/105
See application file for complete search history.

(56) References Cited

U.S. PATENT DOCUMENTS

| | | | | |
|---|---|---|---|---|
| 9,229,654 | B2 * | 1/2016 | Madhusudana | ..... G06F 11/2089 |
| 9,323,658 | B2 * | 4/2016 | Weber | ................... G06F 3/0632 |
| 11,151,071 | B1 * | 10/2021 | Patel | ................... G06F 13/4022 |
| 11,652,746 | B1 * | 5/2023 | Sorenson, III | ........ H04L 9/0643 |
| | | | | 370/235 |
| 2010/0036956 | A1 * | 2/2010 | Nishikawa | .............. G06F 9/505 |
| | | | | 718/105 |
| 2020/0210108 | A1 * | 7/2020 | Palmer | .................. G06F 3/0679 |
| 2021/0124692 | A1 * | 4/2021 | Benisty | .............. G06F 13/4282 |
| 2021/0149828 | A1 * | 5/2021 | Park | .................... G06F 13/1668 |

(Continued)

FOREIGN PATENT DOCUMENTS

CN 112820337 A 5/2021

*Primary Examiner* — Christopher B Shin
(74) *Attorney, Agent, or Firm* — Slater Matsil, LLP

(57) ABSTRACT

This disclosure is related to a network storage method, a storage system, a data processing unit, and a computer system. The network storage method is applied to the storage system. The storage system includes a host, a data processing unit, and a storage device. The data processing unit is connected to the host through a PCIe interface. The storage device includes a plurality of controllers and a plurality of logical units. The method includes: The host sends an input/output request to the data processing unit, where the input/output request is for accessing one of the plurality of logical units. The data processing unit determines, from the plurality of controllers, a controller configured to process the input/output request, to implement load balancing between the plurality of controllers, and sends the input/output request to the determined controller. Multipath software does not need to be installed in the host.

20 Claims, 8 Drawing Sheets

(56) References Cited

U.S. PATENT DOCUMENTS

| | | | | |
|---|---|---|---|---|
| 2021/0357147 A1* | 11/2021 | Li | ............................ | G06F 21/16 |
| 2022/0188256 A1* | 6/2022 | Ballard | ............... | G06F 13/4063 |
| 2022/0350483 A1* | 11/2022 | Freyensee | ............. | G06F 3/0688 |
| 2023/0084601 A1* | 3/2023 | Park | .................... | G06F 11/3058 |
| | | | | 711/154 |
| 2023/0120010 A1* | 4/2023 | Patel | .................. | G06F 12/0802 |
| | | | | 711/118 |

* cited by examiner

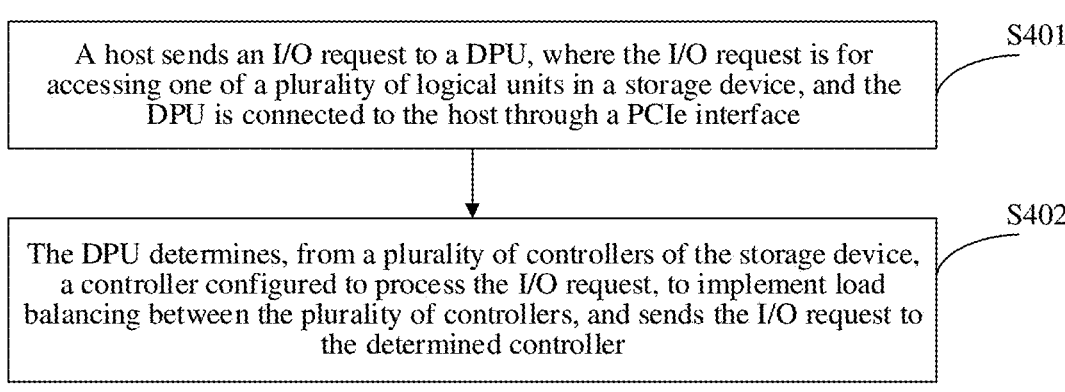

A host sends an I/O request to a DPU, where the I/O request is for accessing one of a plurality of logical units in a storage device, and the DPU is connected to the host through a PCIe interface — S401

The DPU determines, from a plurality of controllers of the storage device, a controller configured to process the I/O request, to implement load balancing between the plurality of controllers, and sends the I/O request to the determined controller — S402

FIG. 4

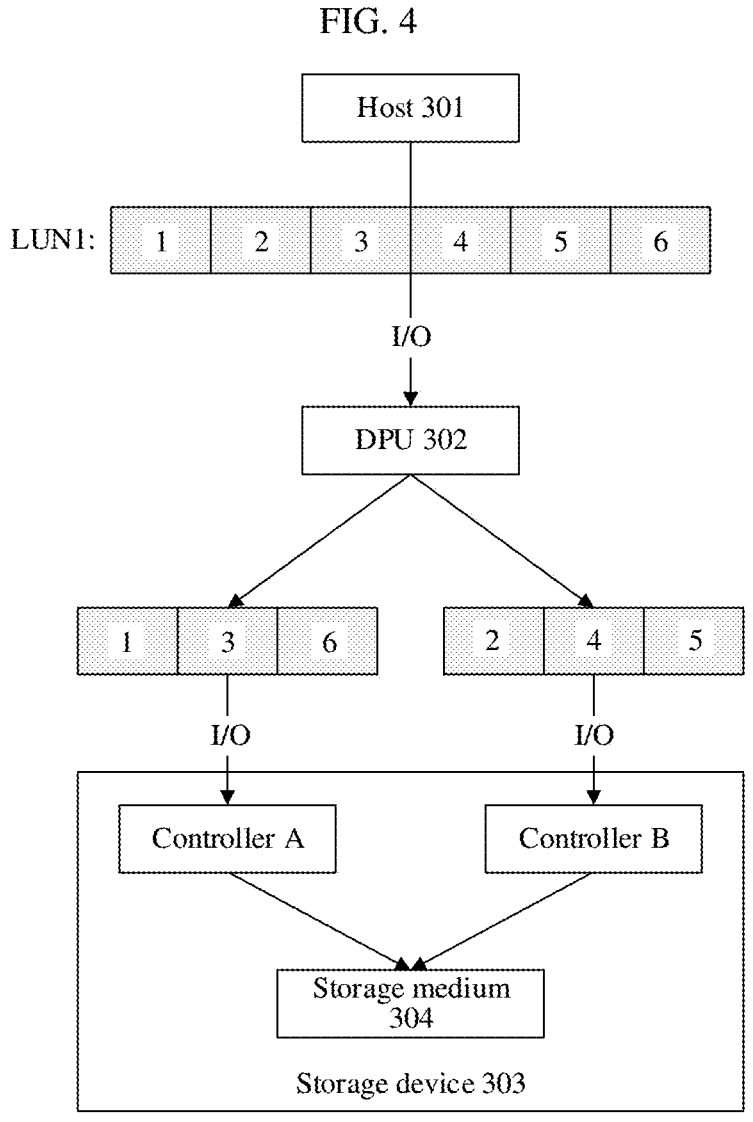

FIG. 5

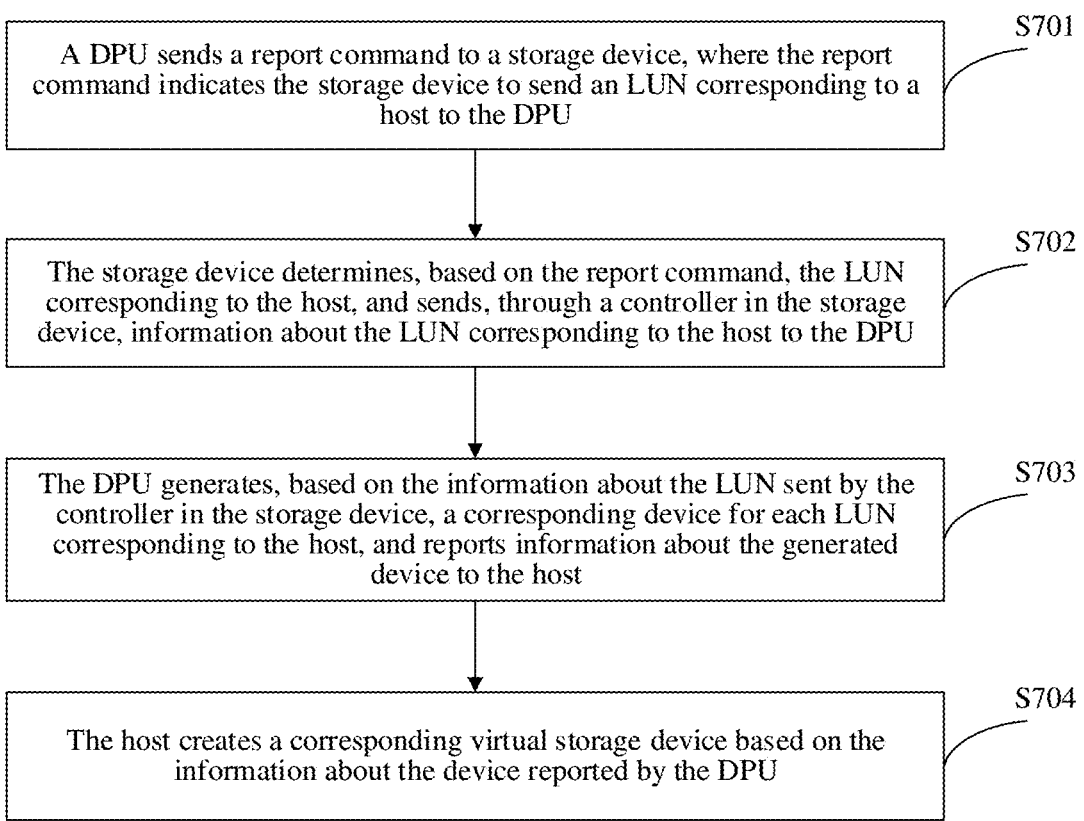

A DPU sends a report command to a storage device, where the report command indicates the storage device to send an LUN corresponding to a host to the DPU — S701

The storage device determines, based on the report command, the LUN corresponding to the host, and sends, through a controller in the storage device, information about the LUN corresponding to the host to the DPU — S702

The DPU generates, based on the information about the LUN sent by the controller in the storage device, a corresponding device for each LUN corresponding to the host, and reports information about the generated device to the host — S703

The host creates a corresponding virtual storage device based on the information about the device reported by the DPU — S704

FIG. 7

Computer system 900

NETWORK STORAGE METHOD, STORAGE SYSTEM, DATA PROCESSING UNIT, AND COMPUTER SYSTEM

CROSS-REFERENCE TO RELATED APPLICATIONS

This application is a continuation of International Application No. PCT/CN2022/127306, filed on Oct. 25, 2022, which claims priority to Chinese Patent Application No. 202111258240.8, filed on Oct. 27, 2021. The disclosures of the aforementioned applications are hereby incorporated by reference in their entireties.

TECHNICAL FIELD

This application relates to the field of storage technologies, and in particular, to a network storage method, a storage system, a data processing unit, and a computer system.

BACKGROUND

As shown in FIG. 1, in a conventional network storage solution, multipath software needs to be installed in a host. The host distributes input/output (I/O) requests to different controllers in a storage array through the multipath software and a host bus adapter (host bus adapter, HBA) card.

If the host uses open-source multipath software or third-party multipath software, cooperation between the multipath software and the controllers in the storage array is not good enough, resulting in load unbalancing between controllers or forwarding of a large quantity of I/O requests between controllers. If the host uses multipath software customized by a storage array provider, and the customized multipath software cooperates with the controllers in the storage array to balance the distribution, corresponding customized multipath software needs to be developed for different host operating systems. However, there are many types and versions of operating systems, which brings great difficulties in software development.

SUMMARY

To resolve the foregoing problem that a host relies on multipath software to implement I/O distribution, embodiments of this application provide a network storage method, a storage system, a data processing unit, and a computer system. Multipath software does not need to be installed in a host, so that I/O requests can be distributed between controllers in a balanced manner, and forwarding of a large quantity of I/O requests between controllers can be avoided.

According to a first aspect, this application provides a network storage method, applied to the storage system. The storage system includes a host, a data processing unit, and a storage device. The data processing unit is connected to the host through a PCIe interface. The storage device includes a plurality of controllers and a plurality of logical units. The network storage method includes: The host sends an input/output request to the data processing unit, where the input/output request is for accessing one of the plurality of logical units. The data processing unit determines, from the plurality of controllers, a controller configured to process the input/output request, to implement load balancing between the plurality of controllers, and sends the input/output request to the determined controller.

It can be learned that the data processing unit may be used as a peripheral device (PCIe device) of the host herein, and is connected to the host through a PCIe interface on the host. Therefore, the host may directly send an I/O request to the data processing unit, and does not need to pay attention to distribution (allocation and sending) of the I/O request between the plurality of controllers in the storage device. This reduces load of a processor (for example, a central processing unit (CPU)) in the host, and saves CPU resources. After receiving the I/O request sent by the host, the data processing unit determines, from the plurality of controllers, the controller configured to process the I/O request, so that load balancing can be implemented among the plurality of controllers. In this way, forwarding of the I/O request between the controllers can be avoided as much as possible. Then, the data processing unit sends the I/O request to the determined controller.

Based on the first aspect, in a possible embodiment, the data processing unit performs communication with the host by using an NVMe protocol, and the data processing unit performs communication with the controllers in the storage device by using an NVMe-oF protocol.

It can be learned that different communication protocols are used between the data processing unit and the host and between the data processing unit and (the controller in) the storage device. Therefore, the data processing unit is further responsible for protocol conversion between the host and the storage device. The host does not need to pay attention to interaction between the host and the storage device. Tasks such as network protocol processing and I/O distribution that are originally performed by the processor in the host are now offloaded to the data processing unit for execution, so that pressure on the processor of the host can be reduced.

Because the host and the data processing unit communicate with each other by using the NVMe protocol, the host may consider the data processing unit as a local NVMe storage device, and the data processing unit is responsible for all interactions with a real storage device. The data processing unit communicates with a storage device (at remote or on a cloud) by using a high-performance storage protocol such as NVMe-oF. This helps improve network storage efficiency of the host, does not affect performance of an operating system of the host, and further facilitates expansion of an external storage capacity of the host.

Based on the first aspect, in a possible embodiment, that the data processing unit determines, from the plurality of controllers, a controller configured to process the input/output request includes: The data processing unit determines, from the plurality of controllers based on a hash algorithm, the controller configured to process the input/output request, to implement the load balancing between the plurality of controllers.

That is, the data processing unit may perform load balancing between controllers by using a hash algorithm. For example, a consistent hashing algorithm may be used to cooperate with the controller. A slice that is divided in a logical unit is used as a granularity of load balancing, and each I/O request delivered by the host is distributed to each controller in the storage device based on a slice to be accessed by the I/O request, to avoid I/O forwarding of the I/O request between controllers.

Based on the first aspect, in a possible embodiment, the method further includes: The data processing unit sends a report command to the storage device, where the report command indicates the storage device to send, to the data processing unit, information about a logical unit corresponding to the host. The data processing unit receives the information about the logical unit corresponding to the host sent by the controllers in the storage device. The data processing unit generates, based on the information about the logical unit corresponding to the host, a corresponding device for the logical unit corresponding to the host, and sends information about the generated device to the host.

It should be noted that the logical unit corresponding to the host is a part of logical units allocated by the storage device to the host. For example, the storage device may allocate one or more logical units in the storage device to the host based on a storage resource requirement of the host or another factor.

It can be learned that the data processing unit may perform an operation of scanning a logical unit for the host, to discover a logical unit allocated by the storage device to the host, and then report the logical unit to the host. Because there is no homing relationship between the controller and the logical unit in the storage device, the storage device may send, by using each controller, information about the logical unit corresponding to the host to the data processing unit. After receiving the information sent by each controller, the data processing unit needs to perform aggregation, generate a corresponding device for each logical unit corresponding to the host, and finally send the generated device information to the host by using the NVMe protocol.

Based on the first aspect, in a possible embodiment, the method further includes: The host generates, based on the information about the device sent by the data processing unit, a virtual storage device corresponding to the device, where the virtual storage device is provided for an application in the host to access.

It should be understood that, after receiving the device information sent by the data unit, the host may abstract the device as a corresponding virtual storage device, and does not directly expose the device to an application in the host.

According to a second aspect, this application provides a storage system. The storage system includes a host, a data processing unit, and a storage device. The data processing unit is connected to the host through a PCIe interface. The storage device includes a plurality of controllers and a plurality of logical units. The host is configured to send an input/output request to the data processing unit, where the input/output request is for accessing one of the plurality of logical units. The data processing unit is configured to determine, from the plurality of controllers, a controller configured to process the input/output request, to implement load balancing between the plurality of controllers, and send the input/output request to the determined controller.

Based on the second aspect, in a possible embodiment, the data processing unit is further configured to: perform communication with the host by using an NVMe protocol; and perform communication with the controllers in the storage device by using an NVMe-OF protocol.

Based on the second aspect, in a possible embodiment, the determining, from the plurality of controllers, a controller configured to process the input/output request includes: determining, from the plurality of controllers based on a hash algorithm, the controller configured to process the input/output request, to implement load balancing between the plurality of controllers.

Based on the second aspect, in a possible embodiment, the data processing unit is further configured to: send a report command to the storage device, where the report command indicates the storage device to send, to the data processing unit, information about a logical unit corresponding to the host; receive the information about the logical unit corresponding to the host sent by the controllers in the storage device; and generate, based on the information about the logical unit corresponding to the host, a corresponding device for the logical unit corresponding to the host, and send information about the generated device to the host.

Based on the second aspect, in a possible embodiment, the host is further configured to generate, based on the information about the device sent by the data processing unit, a virtual storage device corresponding to the device, where the virtual storage device is provided for an application in the host to access.

According to a third aspect, this application provides a data processing unit, where the data processing unit is configured to: receive an input/output request sent by a host, where the data processing unit is connected to the host through a PCIe interface, the input/output request is for accessing one logical unit in a storage device, and the storage device includes a plurality of logical units and a plurality of controllers; and determine, from the plurality of controllers, a controller configured to process the input/output request, to implement load balancing between the plurality of controllers, and send the input/output request to the determined controller.

It should be noted that the data processing unit is a dedicated processor, and may be understood as a data processing unit chip herein. The chip, serving as a PCIe device outside the host, is connected to the host through a PCIe interface. In this way, functions such as balanced distribution of the I/O requests, network protocol processing, and scanning a logical unit for the host, can be provided, thereby reducing pressure on a processor of the host.

Based on the third aspect, in a possible embodiment, the data processing unit is further configured to: perform communication with the host by using an NVMe protocol; and perform communication with the controllers in the storage device by using an NVMe-oF protocol.

Based on the third aspect, in a possible embodiment, the data processing unit is further configured to determine, from the plurality of controllers based on a hash algorithm, the controller configured to process the input/output request, to implement the load balancing between the plurality of controllers.

Based on the third aspect, in a possible embodiment, the data processing unit is further configured to: send a report command to the storage device, where the report command indicates the storage device to send, to the data processing unit, information about a logical unit corresponding to the host; receive the information about the logical unit corresponding to the host sent by the controllers in the storage device; and generate, based on the information about the logical unit corresponding to the host, a corresponding device for the logical unit corresponding to the host, and send information about the generated device to the host.

According to a fourth aspect, this application provides a computer system, where the computer system includes a host and the data processing unit in any embodiment of the third aspect, and the data processing unit is connected to the host through a PCIe interface.

In conclusion, in this embodiment of this application, the data processing unit is configured for the host (the data processing unit is used as a PCIe device outside the host, and is connected to the host through a PCIe interface), and tasks such as balanced distribution of I/O requests, network protocol processing, and scanning a logical unit are all offloaded to the data processing unit, so that pressure on a processor of the host can be reduced. Multipath software does not need to be installed in the host, and only the data processing unit needs to be configured. Therefore, difficulties in developing corresponding customized multipath software for various types of operating systems can be avoided. In addition, currently, almost all types of operating systems support the NVMe protocol, and an NVMe driver in a host operating system may be used to drive the data processing unit. Therefore, the data processing unit is not limited by a type or a version of the host operating system, has good adaptability and universality, and may be widely used.

The data processing unit performs communication with the host by using the NVMe protocol, and is presented to the host as a local NVMe device. Therefore, the host does not need to pay attention to interaction with the storage device. The data processing unit performs communication with the controller in the storage device by using the NVMe-oF protocol, to implement high-performance data access. Actually, storage space of the host is expanded to a storage device at remote or on a cloud, so that a design of the host can be simplified, a storage capacity required by the host locally is reduced as much as possible, and costs are reduced. After receiving an I/O request sent by the host, the data processing unit determines, from the plurality of controllers of the storage device, the controller configured to process the I/O request, to implement load balancing between the controllers. Specifically, a hash algorithm may be used for configuration with the controller, and I/O distribution is performed between the controllers by using a slice as a granularity of load balancing, to avoid forwarding of the I/O request between the controllers.

The data processing unit is further configured to: implement a function of scanning a logical unit, and send a report command to the storage device, to indicate the storage device to send, to the data processing unit, information about a logical unit corresponding to the host. After receiving the information about the logical unit corresponding to the host sent by each controller, the data processing unit generates a corresponding device for each logical unit corresponding to the host, and then sends the generated device information to the host, so that the host perceives storage space (that is, the logical unit corresponding to the host) allocated by the storage device to the host, and may access data in the allocated storage space.

BRIEF DESCRIPTION OF THE DRAWINGS

To describe technical solutions in embodiments of this application more clearly, the following briefly describes the accompanying drawings used in describing the embodiments.

FIG. 4 is a schematic flowchart of a network storage method according to an embodiment of this application;

FIG. 5 is a schematic diagram in which a DPU distributes I/O requests delivered by a host to each controller according to an embodiment of this application;

FIG. 7 is a schematic flowchart of reporting an LUN by a storage device to a host according to an embodiment of this application;

DETAILED DESCRIPTION OF ILLUSTRATIVE EMBODIMENTS

For ease of understanding the technical solutions in embodiments of this application, the following first explains and describes some terms and concepts in embodiments of this application.

1. Data Processing Unit (DPU)

DPU is a major type of a dedicated processor. It is the third important computing chip in data center scenarios after a central processing unit (CPU) and graphics a processing unit (GPU). It provides computing engines for high-bandwidth, low-latency, and data-intensive computing scenarios. The DPU is universal and programmable, but is more dedicated. The DPU is distinguished from the CPU by a large degree of parallelism.

2. Logical Unit (LU)

In a storage technology, various memories (for example, a hard disk) are generally not directly exposed to a host, but a plurality of memories are abstracted into a storage pool (or a memory pool), and then storage space of the storage pool is divided into logical units for use by the host. Each logical unit is assigned a corresponding identifier, that is, a logical unit number (LUN). It should be noted that, since the host can generally directly sense the LUN, a person skilled in the art usually directly use the LUN to represent the logical unit. Unless otherwise specified, the LUN is used to represent the logical unit in the following.

The LUN may have two different identifiers: an LUN ID and a universally unique identifier (UUID). The LUN ID is an identifier of an LUN on a device, and is used to distinguish different LUNs in devices. However, the LUN ID is unique on a same device and may be the same as the LUN ID of an LUN on another device. The UUID is an identifier of an LUN, but is a globally unique number of an LUN. It should be noted that, after the LUN is loaded to the host, the LUN seen from the host is a host LUN, and an identifier of the host LUN is referred to as a host LUN ID. The host LUN is not the actual physical space. It is only the mapping of the LUN on the host. Therefore, the host LUN ID may also be considered as the identifier of the LUN.

3. LUN Has No Ownership

An LUN has no ownership, it means that the LUN does not belong to any (storage) controller. All controllers can access any LUN.

Figure 1:
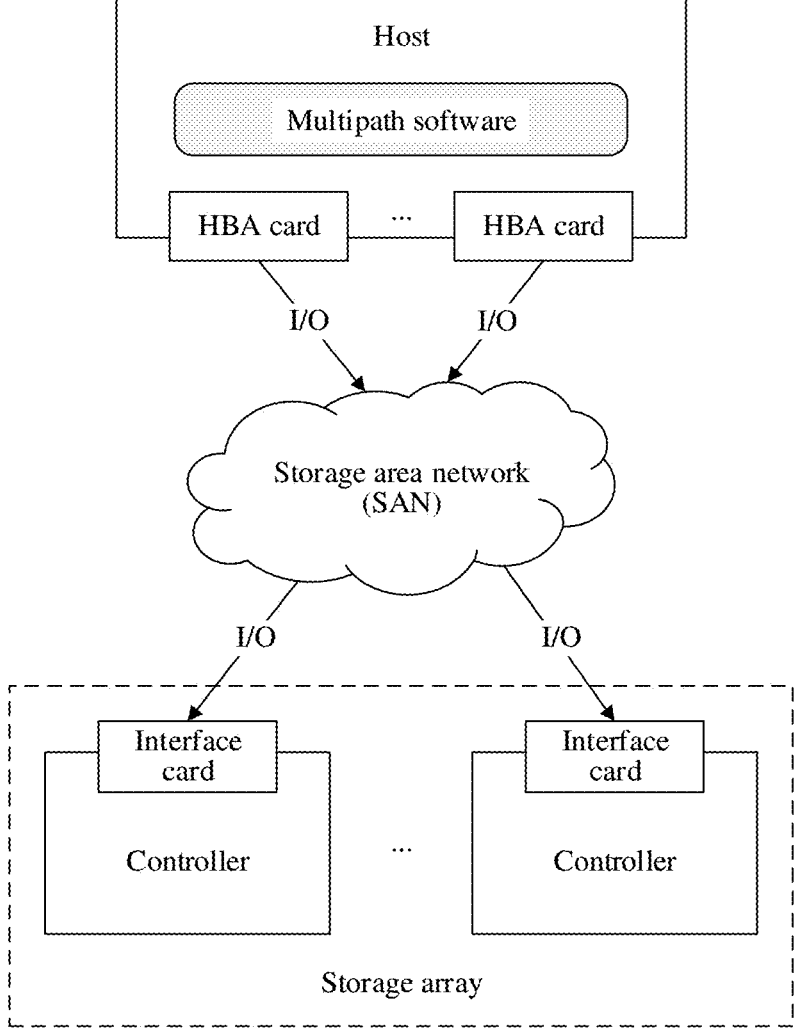
FIG. 1 is a schematic diagram in which a host implements I/O request distribution by relying on multipath software according to an embodiment of this application.
Figure 2:
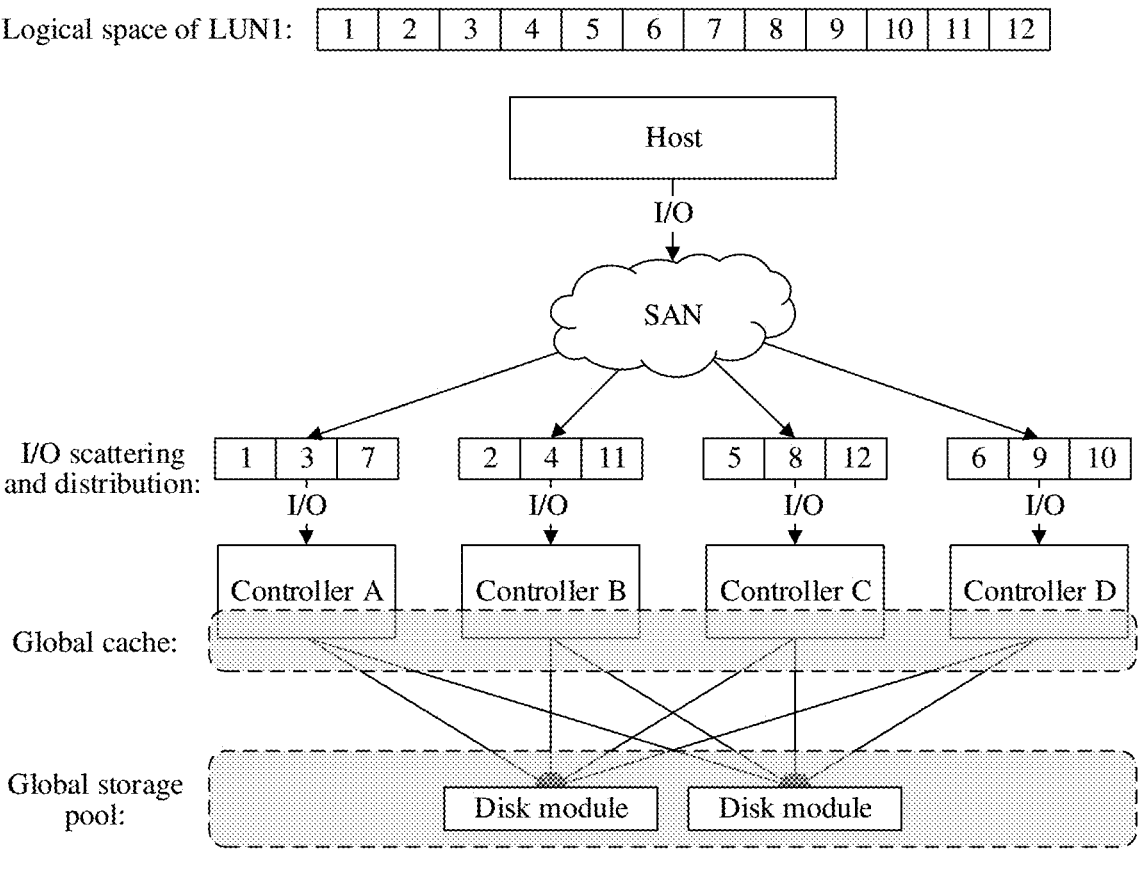
FIG. 2 is a schematic diagram of scattering and distributing, by using a slice as a unit, I/O requests to different controllers according to an embodiment of this application.

For example, as shown in FIG. 2, disks in two disk modules form a storage pool together, and all controllers in the storage system can access storage space of the storage pool. Therefore, the storage pool is global. In addition, the controllers share the access cache (or the caches of the controllers back up each other). Therefore, the cache is also global.

The storage space of the storage pool is divided into LUNs for hosts to use. Each LUN has a corresponding identifier. Each LUN does not belong to any controller and can be accessed by any controller. For example, it is assumed that an LUN1 is divided into 12 slices, and each slice occupies a logical space of a set size in the LUN1. When a host has some I/O requests for accessing slices in the LUN1, the I/O requests are delivered through a storage area network (storage area network, SAN), and are scattered and distributed to controllers (only an example of I/O scattering and distribution is shown). Some I/O requests for accessing a slice 1, a slice 3, or a slice 7 in the LUN1 are allocated to a controller A. Then the controller A accesses the LUN1 based on the allocated I/O requests and performs corresponding I/O operations. Some I/O requests for accessing a slice 2, a slice 4, or a slice 11 in the LUN1 are allocated to a controller B. Therefore, the controller B also accesses the LUN1 based on the allocated I/O requests . . . . In a word, the LUN1 does not belong to any controller, and all the four controllers can access the LUN1.

The following describes a storage system 300 in embodiments of this application.

Figure 3:
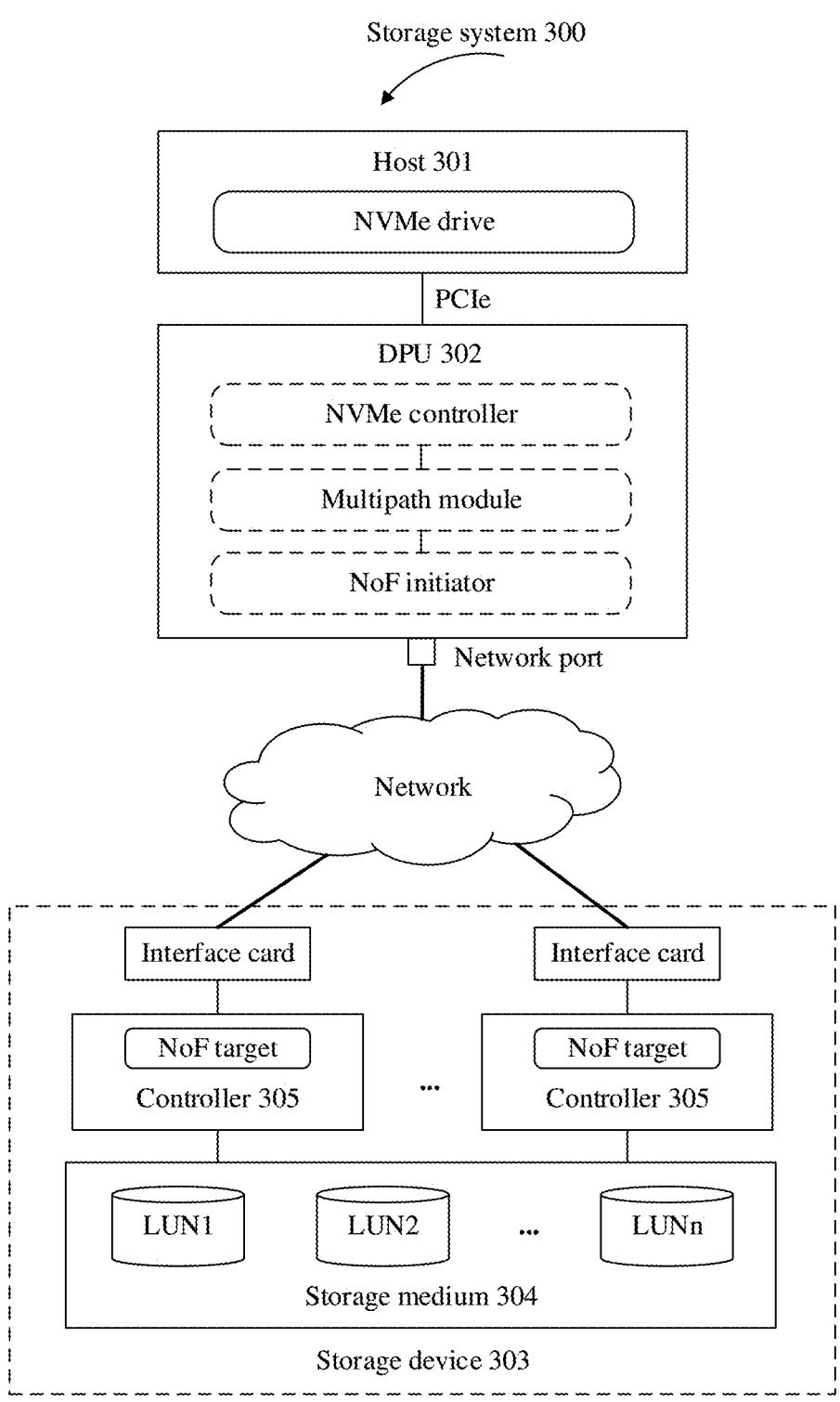
FIG. 3 is an architectural diagram of a storage system according to an embodiment of this application.

FIG. 3 is an architectural diagram of a storage system 300 according to an embodiment of this application. The storage system 300 includes one or more hosts 301 (only one host 301 is used as an example in the figure), a DPU 302, and a storage device 303. Each host 301 has a corresponding DPU 302, and the DPU 302 is connected to the host 301 through a peripheral component interconnect express (PCIe) interface (or is connected to a processor in the host through a PCIe bus). It should be noted that the DPU 302 as shown is located outside the host 301, but the DPU 302 may also be directly integrated into the host 301 or connected to the host 301 in a plug-in manner.

The following separately describes in detail the host 301, the DPU 302, and the storage device 303.

1. The host 301 may be a device such as a server, a notebook computer, or a desktop computer. This is not specifically limited in this application. As shown in FIG. 3, an operating system (OS) of the host 301 includes a non-volatile memory express (NVMe) driver, and the NVMe driver is configured to drive an NVMe device.

In a possible embodiment, various applications may be installed in the host 301. A user may trigger an I/O request by using the applications, to access data.

2. The DPU 302 provides one or more types of network ports for the host 301, so that the host 301 can be connected to a network of a corresponding type, and can interact with the storage device 303. Therefore, the host 301 does not need a separate network interface card (NIC).

For example, when a front-end storage network is a remote direct memory access over converged ethernet (ROCE) network, the DPU 302 provides a RoCE network port for the host 301, so that the host 301 can be connected to the RoCE network, and can store/read data in the storage device 303.

It should be noted that, in addition to directly communicating with the storage device 303 over a network, the DPU 302 may further access the storage device 303 through a switch, to access data. FIG. 3 shows only one network port, but it does not mean that there is only one network port or one type of network port.

In a possible embodiment, the DPU 302 may include an NVMe controller, a multipath module, and an NVMe over Fabrics (NVMe-oF or NoF for short) initiator.

(1) The NVMe controller (that is, the NVMe controller) is configured to implement an NVMe protocol, so that the DPU 302 is presented as an NVMe device to the host 301. In other words, the NVMe controller may simulate the DPU 302 as an NVMe device. From the perspective of the host

301, the DPU 302 is equivalent to a local NVMe device. Therefore, the host 301 may drive the DPU 302 through an NVMe driver of the host 301, and the host 301 and the DPU 302 communicate with each other by using an NVMe protocol.

(2) The multipath module is configured to aggregate LUNs that are reported by the storage device 303 to the DPU 302 through a plurality of paths (or through a plurality of controllers 305), and deliver the aggregated LUNs to the NVMe controller to report the aggregated LUNs to the host 301. The multipath module is further configured to scatter and distribute I/O requests delivered by the host 301 to the controllers 305 in the storage device 303, to implement load balancing between the controllers 305.

(3) The NoF initiator (that is, the NoF initiator, also referred to as an NoF INI for short) is configured to implement an NoF connection to an NoF target (that is, an NoF target), and implement functions such as establishing a communication link, scanning an LUN, and delivering an I/O.

It should be noted that the DPU 302 may further include more or fewer modules. The three modules in the figure, namely, the NVMe controller, the multipath module, and the NoF initiator, are merely an example of division. The modules may be further divided into a plurality of function modules, or a plurality of modules are combined into one module. This is not limited in this application.

3. The storage device 303 may be a storage array, a disk module, a server (cluster), a desktop computer, or the like. This is not specifically limited in this application. The storage device 303 includes a storage medium 304 and a plurality of controllers 305.

(1) The storage medium 304 is configured to provide storage space. The storage space of the storage medium 304 is virtualized into a storage pool, and then is divided into a plurality of LUNs. There is no ownership relationship between the LUNs and the controller 305, and each controller 305 can control access to any LUN.

For example, as shown in FIG. 3, it is assumed that the storage space of the storage medium 304 is divided into n logical units (n is a positive integer greater than 1), and the n logical units are respectively represented by an LUN1, an LUN2, and an LUNn. Each controller 305 in the storage device 303 can access any one of the n logical units. Therefore, there is no ownership relationship between the controller 305 and the LUN.

In this embodiment of this application, the storage medium 304 may be memories of a same type, for example, one or more solid-state drives; or may be a combination of a plurality of types of memories, for example, a combination of a solid-state drive and a mechanical hard disk; or may be one or more disk modules, and one or more hard disks may be placed in the disk modules; or the like. It should be noted that the storage medium 304 is not specifically limited in this application.

(2) The controller 305 is configured to perform access control on the storage medium 304, and perform a corresponding I/O operation based on the received I/O request. Each controller 305 has an NoF target (that is, an NoF target), the NoF target is a software module, and is configured to implement NoF communication with the NoF initiator, and one NoF target represents a node that receives an NoF command.

In a possible embodiment, each controller 305 has a corresponding interface card, so that the controller 305 can be connected to a network. For example, when the front-end storage network is a RoCE network, each controller 305 has a RoCE interface card, so that the controller 305 can be connected to the RoCE network. In addition to the ROCE network, the network may be another type of network that supports the NoF protocol. This is not limited in this application, and an original networking structure does not need to be changed. It should be noted that the interface card in FIG. 3 is located outside the controller 305, but the interface card may also be directly integrated into the controller 305 or connected to the controller 305 in a plug-in manner. This is not limited in this application.

In a possible embodiment, a cache is disposed inside each controller 305 in the storage device 303, and the controllers 305 may share a cache and back up each other.

For example, the storage device 303 is a storage array including two controllers 305 (a controller A and a controller B respectively). A mirror channel exists between the controller A and the controller B. After the controller A writes data into its cache, the controller A may send a copy of the data to the controller B through the mirror channel, and the controller B stores the copy in its cache. Therefore, the controller A and the controller B back up each other. When the controller A is faulty, the controller B can take over the services of the controller A. When the controller B is faulty, the controller A can take over the services of the controller B. This prevents the entire storage array from being unavailable due to hardware faults. Similarly, if four controllers 305 are deployed in the storage array, a mirror channel exists between any two controllers 305. Therefore, any two controllers 305 back up each other.

The following describes, based on the storage system 300, an embodiment of a network storage method provided in this application.

FIG. 4 is a schematic flowchart of a network storage method according to an embodiment of this application. The method is applied to the storage system 300, and includes the following steps.

S401: A host 301 sends an I/O request to a DPU 302, where the I/O request is for accessing one of a plurality of logical units in a storage device 303, and the DPU is connected to the host 301 through a PCIe interface.

It should be understood that the host 301 may send one or more I/O requests to the DPU 302 at a time, and each I/O request may access any one of the plurality of logical units or a specified logical unit. In step S401, one I/O request is used as an example for description, but it does not mean that there can be only one I/O request.

In a possible embodiment, each I/O request includes address information, and the address information indicates an address segment corresponding to the I/O request, to facilitate storing/reading data in the address segment. The address information may directly indicate an address segment to be accessed by the I/O request, or may indirectly indicate an address segment to be accessed by the I/O request. This is not limited in this application.

For example, if the host 301 sends a read request (that is, an O request), address information in the read request indicates an address segment to be accessed by the read request, to facilitate reading data from the address segment. If the host 301 sends a write request (that is, an I request), and the write request further includes data to be written, address information in the write request indicates an address segment to be accessed by the write request, to facilitate storing data in the address segment.

It can be learned from the foregoing content that a storage medium 304 in the storage device 303 is configured to provide storage space. However, the storage space of the storage medium 304 is not directly exposed to the host 301.

Instead, the storage space is virtualized into a storage pool, and then may be divided into LUNs and provided for the host 301 to use. Therefore, in some possible embodiments, the address information includes one or more types of LUN identifiers. The identifier of the LUN herein may be a UUID of the LUN, or may be an identifier that is of the LUN in the storage medium 304 and that is mapped to the host 301, for example, a host LUN ID, or an identifier of a block device (a virtual storage device) corresponding to the LUN in the host 301.

It may be understood that a specific location of the data in the LUN may be determined by a start address and a length of the data. A person skilled in the art usually refer to the start address as a logical block address (LBA). Therefore, in a possible embodiment, the address information includes an identifier of an LUN, an LBA, and a length, and the identifier of the LUN, the LBA, and the length may identify a determined address segment. Therefore, all I/O requests sent by the host 301 are located to an address segment, to facilitate reading data from the address segment or writing data into the address segment.

It should be noted that, in addition to carrying the LUN ID, the LBA, and the length as the address information, the I/O request may further use another logical address to construct the address information, for example, a virtual space ID, and a start address and a length of the virtual space. A representation manner of the address information is not specifically limited in this application.

In a possible embodiment, various applications may be installed in the host 301. A user may trigger, by using the applications running in the host 301, the host 301 to generate an I/O request to access data. Then the host 301 sends the generated I/O request to the DPU 302 by using an NVMe protocol.

S402: The DPU 302 determines, from the plurality of controllers 305 in the storage device 303, a controller 305 configured to process the I/O request, to implement load balancing between the plurality of controllers 305, and sends the I/O request to the determined controller 305.

In a specific embodiment, when the DPU 302 receives one or more I/O requests delivered by the host 301, the DPU 302 separately determines, for the one or more I/O requests from the plurality of controllers 305 in the storage device 303, one controller 305 configured to process the I/O requests, and then separately sends the one or more I/O requests to the determined controller 305, to implement load balancing between the plurality of controllers 305. In other words, each controller 305 in the storage device 303 has a path to the DPU 302. When the DPU 302 receives one or more I/O requests delivered by the host 301, the DPU 302 separately determines one path to the storage device 303 for the one or more I/O requests. To be specific, the one or more I/O requests are distributed to a plurality of paths. This is equivalent to indirectly determining one controller 305 for each I/O request, and then the DPU 302 sends each I/O request to a controller 305 corresponding to a determined path through the path. In this way, load balancing can be implemented between the plurality of controllers 305.

For example, as shown in FIG. 5, the storage device 303 includes two controllers 305: a controller A and a controller B. Both the controller A and the controller B have a path to the DPU 302. For ease of description, the path between the controller A and the DPU 302 is referred to as a path 1, the path between the controller B and the DPU 302 is referred to as a path 2, and both the path 1 and the path 2 may be summarized as paths between the storage device 303 and the DPU 302. The logical unit LUN1 in the storage medium 304 is divided into six slices, which are respectively represented by a slice 1 to a slice 6. Each slice occupies a logical space of a set size in the LUN1.

It is assumed that the host 301 generates some I/O requests, and the I/O requests respectively need to access different slices in the LUN1. Then, the host 301 sends the I/O requests to the DPU 302. Correspondingly, after receiving these I/O requests delivered by the host 301, the DPU 302 separately determines, for each I/O request, the controller 305 configured to process the I/O request, to implement load balancing between the controller A and the controller B. It is assumed that some of the I/O requests for accessing the slice 1, the slice 3, or the slice 6 in the LUN1 is determined to be processed by the controller A (or is determined to be sent to the storage device 303 through the path 1), and some of the I/O requests for accessing the slice 2, the slice 4, or the slice 5 in the LUN1 is determined to be processed by the controller B (or is determined to be sent to the storage device 303 through the path 2). Therefore, the DPU 302 separately sends these I/O requests to different controllers 305 in the storage device 303 through corresponding paths. The I/O requests for accessing the slice 2, the slice 4, or the slice 5 in the LUN1 are sent to the controller A through the path 1, and the I/O requests for accessing the slice 2, the slice 4, or the slice 5 in the LUN1 are sent to the controller B through the path 2.

In a possible embodiment, the DPU 302 includes an NVMe controller, a multipath module, and an NoF initiator. The NVMe controller is responsible for receiving one or more I/O requests sent by the host 301 by using the NVMe protocol, and then delivering the one or more I/O requests to the multipath module in the DPU 302. Then, the multipath module separately determines, for the one or more I/O requests, the controller 305 configured to process the I/O requests, so that load is distributed among a plurality of controllers 305 in the storage device 303 in a balanced manner. Finally, the NoF initiator separately sends the one or more I/O requests to the determined controller 305 based on allocation of the multipath module.

Figure 6:
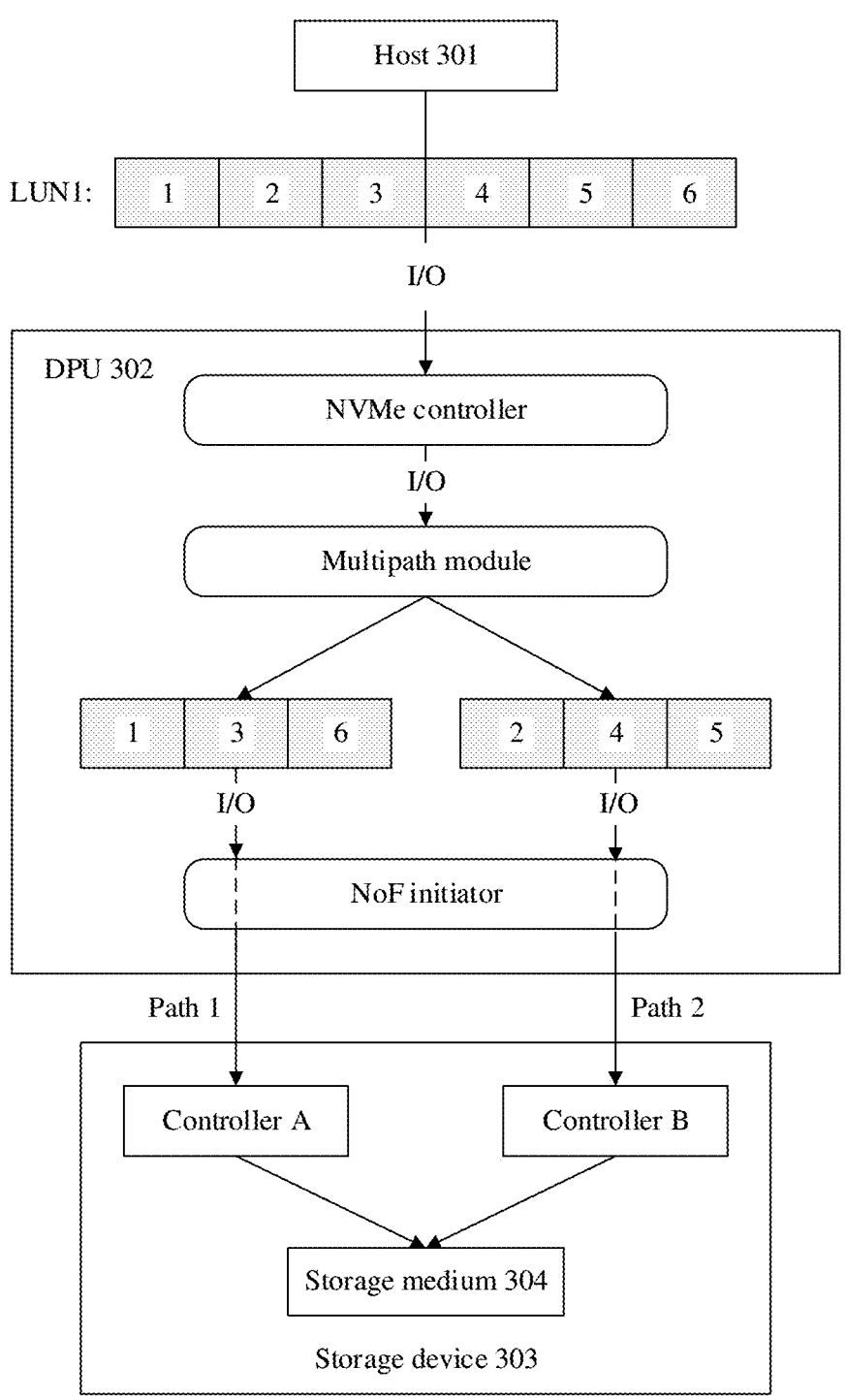
FIG. 6 is a schematic diagram in which a multipath module allocates I/O requests delivered by a host to different controllers according to an embodiment of this application.

For example, as shown in FIG. 6, it is assumed that the storage device 303 includes two controllers 305: a controller A and a controller B. Both the controller A and the controller B have a path to the DPU 302. The path between the controller A and the DPU 302 is referred to as a path 1, the path between the controller B and the DPU 302 is referred to as a path 2, and both the path 1 and the path 2 may be referred to as paths between the storage device 303 and the DPU 302. The LUN1 is one of the logical units obtained by dividing the storage medium 304. A logical space of the LUN1 is divided into six slices, which are respectively represented by a slice 1 to a slice 6. Each slice occupies a logical space of a set size in the LUN1. It may be understood that an I/O request for accessing any slice in the LUN1 may be summarized as an I/O request for accessing the LUN1.

It is assumed that the host 301 generates some I/O requests, and the I/O requests respectively need to access different slices in the LUN1. Then, the host 301 sends the I/O requests to the DPU 302 by using the NVMe protocol. After receiving the I/O requests, the NVMe controller in the DPU 302 sends the I/O requests to the multipath module. The multipath module separately determines a path to the storage device 303 for these I/O requests, to implement load balancing between the controller A and the controller B. The I/O request for accessing the slice 1, the slice 3, or the slice 6 in the LUN1 is determined to be sent to the storage device 303 through the path 1, which is equivalent to allocating the I/O request for accessing the slice 1, the slice 3, or the slice

6 to the controller A. The I/O request for accessing the slice 2, the slice 4, or the slice 6 in the LUN1 is determined to be sent to the storage device 303 through the path 2, which is equivalent to allocating the I/O request to the controller B. Finally, the NoF initiator sends, based on allocation of the multipath module, an I/O request for accessing the slice 1, the slice 3, or the slice 6 to the controller A through the path 1, and sends an I/O request for accessing the slice 2, the slice 4, or the slice 5 to the controller B through the path 2. The controller A and the controller B respectively access corresponding locations in the storage medium 304 based on the received I/O requests, and perform corresponding I/O operations.

In a possible embodiment, the multipath module may perform load balancing based on a hash (Hash) algorithm, determine, from the plurality of controllers 305, the controller 305 configured to process the I/O request, to implement load balancing between the plurality of controllers 305, and then send the I/O request to the determined controller 305. Actually, a hash algorithm may be used to cooperate with the controllers 305, and I/O distribution is performed between the controllers 305 by using a slice as a unit, to avoid forwarding of the I/O request between the controllers 305 as much as possible.

For example, it is assumed that each logical unit is divided into six slices, and each slice occupies a logical space of a set size in the logical unit. The multipath module may allocate, to the controller A based on a consistent hashing algorithm (consistent hashing algorithm), an I/O request for accessing a slice 1, a slice 3, or a slice 5 in a same logical unit, and allocate, to the controller B, an I/O request for accessing a slice 2, a slice 4, or a slice 6 in a same logical unit. To be specific, I/O requests for accessing different slices of a same logical unit are distributed to the controller A and the controller B in a balanced manner, so that load balancing can be implemented between the controller A and the controller B. Certainly, in addition to the hash algorithm, the multipath module may allocate in a balanced manner, to the controllers 305 by using another load balancing algorithm, the I/O requests delivered by the host 301. This is not specifically limited in this application. The multipath module may further determine a corresponding controller 305 for the I/O request based on a factor such as an access quantity of each controller per unit time or a CPU utilization rate of each controller, to implement load balancing between the controllers 305.

In a possible embodiment, there is no ownership relationship between the LUN and the controller, but there may be a correspondence between different slices in a same logical unit and the controller. The multipath module may determine, based on slices to be accessed by the I/O request and a correspondence between the slices and the controller 305, a controller 305 corresponding to the allocation as the controller 305 for processing the I/O request. Then the NoF initiator sends the I/O request to the determined controller 305 by using the NoF protocol.

For example, there is no ownership relationship between the LUN1 in the storage device 303 and each controller 305, and each controller 305 can access the LUN1. However, there is a correspondence between each slice in the LUN1 and each controller 305. It is assumed that the LUN1 is divided into six slices, where a slice 1, a slice 3, and a slice 5 correspond to the controller A, and a slice 2, a slice 4, and a slice 6 correspond to the controller B. To be specific, all I/O requests for accessing the slice 1, the slice 3, and the slice 5 in the LUN1 are processed by the controller A, and all I/O requests for accessing the slice 2, the slice 4, and the slice 6 in the LUN1 are processed by the controller B. This correspondence allocates I/O requests for accessing the LUN1 to different controllers 305 by using a slice as a granularity, which helps implement load balancing between the controller A and the controller B. Therefore, when receiving an I/O request for accessing the LUN1, the multipath module may first determine a slice (assuming that is the slice 1) in the LUN1 to be actually accessed by the I/O request. Then, the multipath module may determine, based on a correspondence between the slice 1 and the controller A, the controller A as the controller 305 configured to process the I/O request, and finally send the I/O request to the controller A.

In conclusion, in the storage system 300 provided in this embodiment of this application, a corresponding DPU 302 is configured for the host 301. The DPU 302 is used as an external PCIe device of the host 301, and is connected to the host 301 through a PCIe interface. As a connection hub between the host 301 and the storage device 303, the DPU 302 offloads tasks of the host 301, such as multipath distribution of I/O requests, network protocol processing, and scanning an LUN, to the DPU 302, thereby reducing pressure on a CPU of the host 301, simplifying a design of the host 301, and reducing costs.

Because the host 301 does not need to install multipath software, a software developer does not need to additionally develop multipath software. Therefore, difficulties brought by developing corresponding customized multipath software for a plurality of operating systems can be avoided. In addition, currently, almost all types of operating systems support the NVMe protocol, and an NVMe driver in a host operating system may be used to drive the DPU 302. Therefore, the DPU 302 is not limited by a type or a version of the host operating system, has good applicability, and may be widely used in various hosts 301. The host 301 may directly use the DPU 302 as a local NVMe device. Therefore, the host 301 does not need to pay attention to communication with the storage device 303, and only needs to directly send the generated I/O requests to the DPU 302. This has relatively small impact on performance of the host 301.

The NVMe controller in the DPU 302 is responsible for implementing the NVMe protocol, and performing NVMe communication with the host 301. When receiving the I/O requests sent by the host 301 by using the NVMe protocol, the NVMe controller sends the I/O requests to the multipath module in the DPU 302. The multipath module is responsible for allocating the I/O requests to the controller 305 in the storage device 303, to implement balanced distribution of the I/O requests among the plurality of controllers 305. Specifically, a hash algorithm may be used to cooperate with the controller 305, and I/O distribution is performed between the controllers 305 by using a slice as a unit. Therefore, load balancing between the controllers 305 can be implemented, and forwarding of a large quantity of I/O requests between the controllers 305 can be avoided. The NoF initiator in the DPU 302 performs communication with the controller in the storage device by using the NVMe-OF protocol. Therefore, high-performance data access can be implemented. To be specific, storage space of the host 301 is expanded to a storage device 303 at remote or on a cloud, so that a design of the host 301 can be simplified, a storage capacity required by the host 301 locally is reduced as much as possible, and costs are reduced.

The DPU 302 is responsible for balanced distribution of I/O requests among the plurality of controllers 305. Therefore, another advantage is that a hardware design of the storage device 303 can be simplified. A corresponding design of load balancing does not need to be added on the storage device 303 side (for example, a customized chip is designed to implement balanced distribution of I/O requests among the plurality of controllers 305). Each controller 305 performs processing based on an I/O request received by the controller 305.

In a possible embodiment, after step S402, the network storage method further includes: Each controller 305 in the storage device 303 processes the I/O request received by the controller 305.

Specifically, each controller 305 in the storage device 303 determines, based on the address information in the received I/O request, an address segment to be accessed by the I/O request, and then performs a corresponding I/O operation on the address segment.

For example, the I/O request received by the controller A carries an identifier of an LUN8, an LBA, and a length as address information. Based on the identifier of the LUN8, the LBA, and the length, it may be determined that the I/O request needs to access an address segment whose start address is the LBA and whose length is the length in the LUN8, and then a corresponding I/O operation is performed on the address segment. If the request is a write request, corresponding data is written into the address segment. If the request is a read request, corresponding data is read from the address segment.

It should be noted that, how the controller 305 accesses the storage medium 304 based on the I/O request is not specifically limited in this application. For example, after determining the address segment based on the I/O request, further, the controller A actually needs to determine a corresponding global address based on the address segment (one global address may be indexed by one address segment, and space indicated by the global address is unique in the storage pool). Then, the controller A accesses a corresponding physical location in the storage medium 304 based on the global address (a physical address corresponding to the global address may also be determined based on the global address, and the physical address indicates a memory in which a space represented by the global address is actually located, and an offset in the memory, that is, a location of the physical space).

It should be understood that before the host 301 delivers the I/O request to the storage device 303 through the DPU 302, the storage device 303 needs to report, to the host 301, an LUN corresponding to the host 301. With reference to the storage system 300, the following describes a process in which the storage device 303 reports the LUN to the host 301.

FIG. 7 is a schematic flowchart of reporting an LUN by a storage device 303 to a host 301 according to an embodiment of this application. The flowchart is applied to a storage system 300, and includes the following steps.

S701: The DPU 302 sends a report command to the storage device 303, where the report command indicates the storage device 303 to send an LUN corresponding to the host 301 to the DPU 302.

It should be noted that the storage medium 304 in the storage device 303 is virtualized into a storage pool, and then divided into LUNs for use by the host 301. The LUN corresponding to the host 301 is an LUN allocated by the storage device 303 to the host 301. For example, the storage device 303 may provide one or more LUNs for the host 301 based on a resource requirement of the host 301 or another factor.

It should be further noted that reporting one or some LUNs refers to reporting information related to the LUN. The information related to the LUN may include an identifier, a logical address, and a capacity of the LUN, which is not specifically limited in this application.

In a possible embodiment, the DPU 302 may separately send the report command to the storage device 303 through a plurality of paths.

It should be noted that each controller 305 in the storage device 303 may have a path to the DPU 302. A path between any controller 305 in the storage device 303 and the DPU 302 may be summarized as a path between the storage device 303 and the DPU 302. Because the storage device 303 has a plurality of controllers 305, there are a plurality of paths between the storage device 303 and the DPU 302. Therefore, that the DPU 302 separately sends the report command to the storage device 303 through the plurality of paths may be that the DPU 302 separately sends the report command to the plurality of controllers 305 in the storage device 303.

In a possible embodiment, the report command sent by the DPU 302 to the storage device 303 carries an identifier of the host 301 and/or information about a port of the DPU 302 that transmits the report command.

In a possible embodiment, the DPU 302 may sense a change of an LUN configuration in the storage device 303 (for example, an LUN newly allocated to the host 301), and actively send a report command to the storage device 303. To be specific, the DPU 302 may implement a function of scanning the LUN in place of the host 301, so that the host 301 can sense a change of a logical unit allocated by the storage device 303 to the host 301.

S702: The storage device 303 determines, based on the report command, the LUN corresponding to the host 301, and sends, through the controller 305 in the storage device 303, information about the LUN corresponding to the host 301 to the DPU 302.

In a specific embodiment, the storage device 303 sends the information about the LUN corresponding to the host 301 to the DPU 302 through a plurality of paths between the storage device 303 and the DPU 302. It should be understood that, because there is no ownership relationship between the LUN and the controller 305, a same LUN needs to be reported through a plurality of controllers 305, that is, reported through a plurality of paths, so that the DPU 302 determines a plurality of access paths for the same LUN.

In a possible embodiment, after determining, based on the report command, the LUN corresponding to the host 301, the storage device 303 generates LUN report information, and then sends the LUN report information to the DPU 302 through a plurality of paths. The LUN report information includes information about the LUN corresponding to the host 301, for example, an identifier, a logical address range, and a capacity of the LUN It may be understood that, the storage device 303 sends the LUN report information to the DPU 302 separately through a plurality of paths between the storage device 303 and the DPU 302. Therefore, the DPU 302 receives the LUN report information from different paths. Alternatively, the plurality of controllers 305 send the LUN report information to the DPU 302 respectively, and the DPU 302 receives the LUN report information from different controllers 305.

In a possible embodiment, in a process of transmitting the LUN report information, the controllers 305, through which the LUN report information passes, add identifiers of ports of the controllers 305 (or identifiers of the controllers 305) to the LUN report information, that is, add corresponding path information to the LUN report information. For example, the LUN report information sent by the controller A in the storage device 303 to the DPU 302 carries an identifier of a port of the controller A, and the LUN report information sent by the controller B to the DPU 302 carries an identifier of a port of the controller B, to distinguish LUN report information coming from different paths.

S703: The DPU 302 generates, based on the information about the LUN sent by the controller in the storage device 303, a corresponding device for each LUN corresponding to the host 301, and reports the generated device information to the host 301.

In a possible embodiment, the NoF initiator in the DPU 302 is responsible for receiving the LUN report information sent by each controller 305, and then generating a corresponding device (a virtual device) for each LUN indicated in the LUN report information sent by each controller 305. Then, a multipath module aggregates, based on the LUN UUID, devices corresponding to the same LUN in the devices generated by the NoF initiator, to obtain an aggregated device. The NVMe controller separately represents the aggregated device by using a namespace (namespace, NS) defined in the NVMe protocol, allocates a corresponding namespace identifier, and then reports the namespace identifier to the host 301.

In a possible embodiment, the multipath module sets a path for reporting an LUN by the storage device 303 as a path for accessing the LUN.

For example, it is assumed that a path between the controller A and the DPU 302 is a path 1, and a path between the controller B and the DPU 302 is a path 2. Information about an LUN1 is sent to the DPU 302 through the controller A and the controller B respectively. Therefore, the multipath module in the DPU 302 sets the path 1 and the path 2 as the paths for accessing the LUN1. Subsequently, when the DPU 302 receives an I/O request for accessing the LUN1, the DPU 302 may select a path from the two paths based on a preset policy (for example, a load balancing policy), and send, through the determined path, the I/O request to the controller 305 corresponding to the path in the storage device 303.

S704: The host 301 creates a corresponding virtual storage device based on the information about the device reported by the DPU 302.

It should be understood that the host 301 generates a corresponding virtual storage device based on the received information about the device, which means that the device reported by the DPU 302 is abstracted, and is not directly exposed to an application in the host 301. The application can only sense the created virtual storage device and access the virtual storage device.

In a possible embodiment, after receiving the information about the namespace sent by the NVMe controller in the DPU 302, the NVMe initiator in the host 301 registers the information as a block device in the host 301 (the block device is a virtual storage device, and is provided for an application in the host 301 to operate). This includes allocating a corresponding name to the block device, establishing a mapping relationship between the block device and the namespace, and recording other information in the block device, such as logical address space, capacity, and the like.

Figure 8:
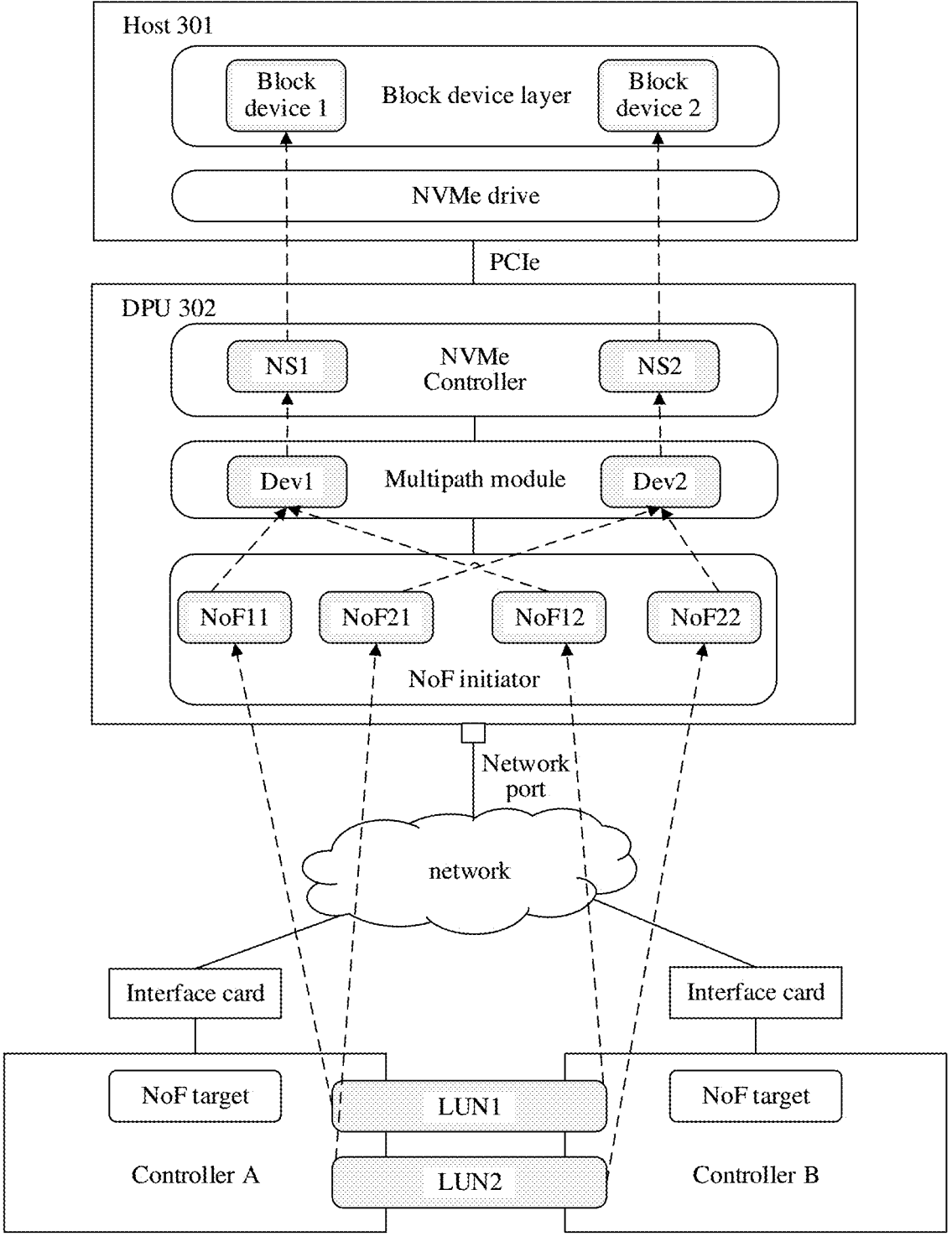
FIG. 8 is a schematic diagram of reporting an LUN1 and an LUN2 to a host according to an embodiment of this application.

With reference to FIG. 8, the following uses an example to describe a procedure for reporting an LUN in FIG. 7.

As shown in FIG. 8, it is assumed that the storage device 303 (not shown for ease of viewing the figure) has two controllers 305: a controller A and a controller B. Both the controller A and the controller B have a path to the DPU 302, and both the two paths belong to a path between the storage device 303 and the DPU 302. The two logical units LUN1 and LUN2 that are divided in the storage device 303 are both LUNs corresponding to the host 301. Because there is no ownership relationship between the LUN and the controller 305, any controller 305 can perform access control on the LUN1 and the LUN2.

It is assumed that the DPU 302 sends the report command to the storage device 303. The storage device 303 may determine, based on the identifier of the host 301 in the report command, the LUN1 and the LUN2 corresponding to the host 301. Then, the storage device 303 may report the LUN1 and the LUN2 to the DPU 302 through the controller A and the controller B respectively, that is, send information about the LUN1 and the LUN2 to the DPU 302 through two different paths.

As shown in FIG. 8, the NoF initiator in the DPU 302 generates a corresponding device named NoF11 for the LUN1 based on the information about the LUN1 sent by controller A, and generates another corresponding device named NoF12 for the LUN1 based on the information about the LUN1 sent by the controller B. As shown, the LUN1 is reported through two different paths. The LUN1 is identified as two devices by the NoF initiator, and the two devices correspond to the LUN1. Similarly, the NoF initiator also generates two corresponding devices, which are NoF21 and NoF22 respectively, for the LUN2 based on the information of the LUN2 sent by the controller A and the controller B respectively.

The multipath module may identify, based on the LUN UUID, that NoF11 and NoF12 correspond to the same LUN (that is, the LUN1), and then aggregate the two devices into a device Dev1. Therefore, the Dev1 corresponds to the LUN1. Similarly, the multipath module also aggregates NoF21 and NoF22 into a same device Dev2. Because the NVMe controller is configured to implement the NVMe protocol, the NVMe controller needs to use namespaces defined in the NVMe protocol to represent Dev1 and Dev2, and identify Dev1 and Dev2 as NS1 and NS2 respectively. The NS1 and NS2 are actually corresponding to the LUN1 and the LUN2 in the storage device 303 respectively. Then, the NVMe controller reports information about the NS1 and the NS2 to the host 301.

After receiving the information about the NS1 and the NS2 reported by the DPU 302, the NVMe driver in the host 301 registers the NS1 and the NS2 with the block device layer, and generates two corresponding block devices, which are respectively represented by nvmeon1 and nvmeon2, to provide the two corresponding block devices for an upper-layer application to operate.

It should be noted that names of various devices in the foregoing examples are examples, and do not constitute a limitation.

In conclusion, in the storage system 300 provided in this embodiment of this application, the host 301 does not need to install multipath software, and only needs to be equipped with a corresponding DPU 302. Therefore, a software developer does not need to additionally develop multipath software, thus, difficulties brought by developing customized multipath software for a plurality of operating systems can be avoided. In this embodiment of this application, the DPU 302 performs the function of scanning an LUN for the host 301, and sends the report command to the storage device 303. The DPU 302 is further responsible for aggregating (information about) LUNs reported by the storage device 303 through the plurality of paths, and then reporting the information about the device obtained after aggregation to the host 301. Therefore, the host 301 does not need to pay attention to communication between the host 301 and the storage device 303, and offloads functions such as network protocol processing and scanning an LUN to the DPU 302. In this way, pressure on a processor (for example, a CPU) of the host 301 is reduced, the design of the host 301 is simplified, a local storage capacity of the host 301 is reduced, and costs are reduced.

An embodiment of this application further provides a data processing unit. The data processing unit may be the DPU 302 in any one of the foregoing embodiments. The data processing unit is configured to: receive an input/output request sent by a host 301, where the data processing unit is connected to the host 301 through a PCIe interface, the input/output request is for accessing one logical unit in a storage device 303, and the storage device 303 includes a plurality of logical units and a plurality of controllers 305; and determine, from the plurality of controllers 305, a controller 305 configured to process the input/output request, to implement load balancing between the plurality of controllers 305, and send the input/output request to the determined controller 305.

It should be noted that the data processing unit is a dedicated processor, and may be understood as a data processing unit chip herein. The chip may be used as a PCIe device outside the host, and is connected to the host through the PCIe interface.

In a possible embodiment, the data processing unit is further configured to: perform communication with the host 301 by using an NVMe protocol; and perform communication with the controllers 305 in the storage device 303 by using an NVMe-oF protocol.

In a possible embodiment, the data processing unit is further configured to determine, from the plurality of controllers 305 based on a hash algorithm, the controller 305 configured to process the input/output request, to implement the load balancing between the plurality of controllers 305.

In a possible embodiment, the data processing unit is further configured to: send a report command to the storage device 303, where the report command indicates the storage device 303 to send, to the data processing unit, information about a logical unit corresponding to the host 301; receive the information about the logical unit corresponding to the host 301 sent by the controllers 305 in the storage device 303; and generate, based on the information about the logical unit corresponding to the host 301, a corresponding device for the logical unit corresponding to the host 301, and send information about the generated device to the host 301.

Figure 9:
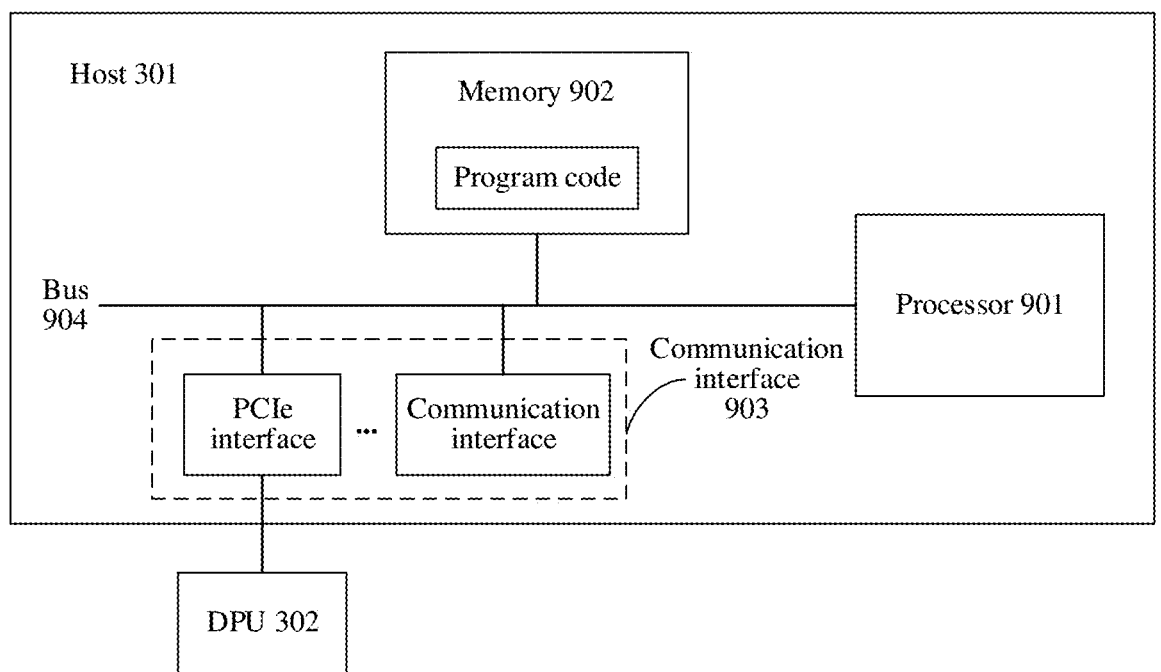
FIG. 9 is a schematic diagram of a structure of a computer system according to an embodiment of this application.

FIG. 9 is a schematic diagram of a structure of a computer system 900 according to an embodiment of this application. The computer system 900 includes a host 301 and the DPU 302 in any one of the foregoing embodiments. The DPU 302 is connected to the host 301 through a PCIe interface. To be specific, the computer system 900 includes part of the host 301 and an external device (the DPU 302 is used as an external device).

The host 301 includes a processor 901, a memory 902, and a communication interface 903. The processor 901, the memory 902, and the communication interface 903 may be connected to each other through an internal bus 904, or may implement communication through another means such as wireless transmission. In this embodiment of this application, connection through the bus 904 is used as an example. The bus 904 may be a peripheral component interconnect (PCI) bus, a peripheral component interconnect express (PCIe) bus, an extended industry standard architecture (EISA) bus, a unified bus (Ubus or UB), a compute express link (CXL), a cache coherent interconnect for accelerators (CCIX), or the like. In addition to a data bus, the bus 904 may further include an address bus, a power bus, a control bus, a status signal bus, and the like. However, for clear description, only one bold line is used to represent the bus in the figure, and various buses are marked as the bus 904, but this does not mean that there is only one bus or only one type of bus.

The processor 901 may include at least one general purpose processor, for example, a central processing unit (CPU), or a combination of a CPU and a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof. The processor 901 executes various types of digital storage instructions, for example, a software or firmware program stored in the memory 902, so that the computer system 900 can provide a plurality of services.

The memory 902 is configured to store program code, and the processor 901 controls execution of the program code.

The memory 902 may include a volatile memory, for example, a random access memory (RAM). The memory 902 may alternatively include a non-volatile memory, for example, a read-only memory (ROM), a flash memory, a hard disk drive (HDD), or a solid-state drive (SSD). The memory 902 may alternatively include a combination of the foregoing types of memories. The memory 902 may store program code, and may be specifically configured to execute any embodiment of the network storage method in FIG. 7 or any embodiment in FIG. 8. Details are not described herein again.

The communication interface 903 includes at least one PCIe interface and another communication interface, may be a wired interface (for example, an Ethernet interface), may be an internal interface, a wired interface (for example, an Ethernet interface), or a wireless interface (for example, a cellular network interface or a wireless local area network interface), and is configured to communicate with another device or module. The DPU 302 is connected to the processor 901 of the host 301 through the PCIe interface of the host 301, to perform any embodiment of the network storage method in FIG. 7 or any embodiment of reporting an LUN in FIG. 8.

It should be noted that FIG. 9 is merely a possible implementation of this embodiment of this application. In actual application, the computer system 900 may further include more or fewer components. This is not limited herein. For content that is not shown or not described in this embodiment of this application, refer to related descriptions in any embodiment of FIG. 7 or FIG. 8. Details are not described herein again.

An embodiment of this application further provides a computer-readable storage medium. The computer-readable storage medium stores instructions. When the instructions are run on a processor, the method in any embodiment of FIG. 7 or FIG. 8 is implemented.

An embodiment of this application further provides a computer program product. When the computer program product is run on a processor, the method in any embodiment of FIG. 7 or FIG. 8 is implemented.

A person of ordinary skill in the art may understand that all or some of the processes of the methods in the embodiments may be implemented by a computer program instructing relevant hardware. The program may be stored in a computer-readable storage medium. When the program runs, the processes of the methods in embodiments are performed. The storage medium may be a magnetic disk, an optical disc, a read-only memory (ROM), a random access memory (RAM), or the like.

What is disclosed above is merely embodiments of this application, and certainly is not intended to limit the protection scope of this application. A person of ordinary skill in the art may understand that all or some of processes that implement the foregoing embodiments and equivalent variations made in accordance with the claims of this application shall fall within the scope of the present invention.

What is claimed is:

1. A method, applied to a storage system comprising a host, a data processing unit, and a storage device, the data processing unit being external to the host and connected to the host through a peripheral component interconnect express (PCIe) interface, the storage device comprising a plurality of controllers and a plurality of logical units, and the method comprising:

sending, by the host, an input/output request to the data processing unit by using a non-volatile memory express (NVMe) protocol, wherein the input/output request requests to access a first logical unit of the plurality of logical units; and selecting, by the data processing unit from the plurality of controllers, a controller for processing the input/output request, to implement load balancing between the plurality of controllers, and sending, by the data processing unit using an initiator of the data processing unit, the input/output request to the determined controller by using an NVMe over Fabrics (NVMe oF) protocol.

2. The method according to claim 1, wherein selecting, by the data processing unit from the plurality of controllers, the controller for processing the input/output request comprises:

selecting, by the data processing unit from the plurality of controllers based on a hash algorithm, the controller for processing the input/output request, to implement load balancing between the plurality of controllers.

3. A storage system, comprising:

a host, comprising at least one first processor;
   a data processing unit comprising an initiator; and
   a storage device;
   wherein the data processing unit is external to the host and connected to the host through a peripheral component interconnect express (PCIe) interface, and the storage device comprises a plurality of controllers and a plurality of logical units;
   wherein the at least one first processor of the host is configured to send an input/output request to the data processing unit by using a non-volatile memory express (NVMe) protocol, wherein the input/output request requests to access a first logical unit of the plurality of logical units; and
   wherein the data processing unit comprises circuitry configured to select, from the plurality of controllers, a controller for processing the input/output request, to implement load balancing between the plurality of controllers, and to send, using the initiator of the data processing unit, the input/output request to the determined controller by using an NVMe over Fabrics (NVMe oF) protocol.

4. The system according to claim 3, wherein determining selecting, from the plurality of controllers, the controller for processing the input/output request comprises:

determining, from the plurality of controllers based on a hash algorithm, the controller for processing the input/output request, to implement load balancing between the plurality of controllers.

5. The system according to claim 3, wherein the data processing unit comprises circuitry further configured to:

send a report command to the storage device, wherein the report command indicates to the storage device to send, to the data processing unit, information about a logical unit corresponding to the host;

receive the information about the logical unit corresponding to the host sent by the controllers in the storage device; and generate, based on the information about the logical unit corresponding to the host, a corresponding device for the logical unit corresponding to the host, and send information about the generated device to the host.

6. The system according to claim 5, wherein the at least one first processor of the host is further configured to:

generate, based on the information about the device sent by the data processing unit, a virtual storage device corresponding to the device, wherein the virtual storage device is provided for an application in the host to access.

7. A data processing unit, comprising:

an interface, configured to communicate with a host, wherein the data processing unit is external to the host; and at least one integrated circuit, configured to:

receive an input/output request sent by the host by using a non-volatile memory express (NVMe) protocol, wherein the data processing unit is connected to the host through a peripheral component interconnect express (PCIe) interface, the input/output request requests to access a first logical unit in a storage device, and the storage device comprises a plurality of logical units and a plurality of controllers; and select, from the plurality of controllers, a controller for processing the input/output request, to implement load balancing between the plurality of controllers, and send, using an initiator of the data processing unit, the input/output request to the determined controller by using an NVMe over Fabrics (NVMe oF) protocol.

8. The data processing unit according to claim 7, wherein the at least one integrated circuit is further configured to:

select, from the plurality of controllers based on a hash algorithm, the controller for processing the input/output request, to implement load balancing between the plurality of controllers.

9. The data processing unit according to claim 7, wherein the at least one integrated circuit is further configured to:

send a report command to the storage device, wherein the report command indicates to the storage device to send, to the data processing unit, information about a logical unit corresponding to the host;

receive the information about the logical unit corresponding to the host sent by the controllers in the storage device; and generate, based on the information about the logical unit corresponding to the host, a corresponding device for the logical unit corresponding to the host, and send information about the generated device to the host.

10. The method according to claim 1, wherein the initiator is an NVMe-oF initiator.

11. The storage system according to claim 3, wherein the initiator is an NVMe-oF initiator.

12. The data processing unit according to claim 7, wherein the initiator is an NVMe-oF initiator.

13. The method according to claim 1, wherein each controller comprises an initiator target of the initiator of the data processing unit.

14. The storage system according to claim 3, wherein each controller comprises an initiator target of the initiator of the data processing unit.

15. The storage system according to claim 3, wherein a mirror channel exists between at least two controllers of the plurality of controllers.

16. The storage system according to claim 3, wherein the data processing unit communicates with the storage device through a switch.

17. The method according to claim 1, wherein the data processing unit communicates with the storage device through a switch.

18. The method according to claim 1, wherein each controller of the plurality of controllers has a separate path to the data processing unit.

19. The storage system according to claim 3, wherein all controllers of the plurality of controllers are able to access all of a global storage pool of the storage device.

20. The data processing unit according to claim 7, wherein each logical unit of the plurality of logical units is able to be accessed by all controllers of the plurality of controllers.

* * * * *